United States Patent [19]
Glaze et al.

[11] 3,955,783
[45] May 11, 1976

[54] HYDRAULIC ACTUATING ARRANGEMENT FOR AIRCRAFT CONTROL SURFACES

[75] Inventors: Stanley George Glaze, Brierley Hill; John Richard Simmons, Wolverhampton, both of England

[73] Assignee: Joseph Lucas (Industries) Limited, Birmingham, England

[22] Filed: Dec. 4, 1974

[21] Appl. No.: 529,517

[30] Foreign Application Priority Data
Dec. 7, 1973 United Kingdom............... 56952/73

[52] U.S. Cl.............................. 244/85; 91/363 A; 244/194; 244/83 E; 318/565
[51] Int. Cl.² ........................................ B64C 13/40
[58] Field of Search............. 91/361, 363 R, 363 A; 244/77 SE, 77 M, 77 F, 77 V, 78, 83 E, 85; 307/204, 219; 318/563–565

[56] References Cited
UNITED STATES PATENTS

| | | | |
|---|---|---|---|
| 3,120,787 | 2/1964 | Schmitt............................ | 244/85 X |
| 3,136,504 | 6/1964 | Carr...................................... | 244/78 |
| 3,198,082 | 8/1965 | Kerris........................... | 244/77 M X |
| 3,433,125 | 3/1969 | Gemmell........................... | 244/78 X |
| 3,496,836 | 2/1970 | Jenney .......................... | 244/77 M X |
| 3,679,156 | 7/1972 | Redmond, Jr. .................... | 244/78 X |
| 3,813,990 | 6/1974 | Coppula et al............... | 244/77 M X |

*Primary Examiner*—Trygve M. Blix
*Assistant Examiner*—Stephen G. Kunin
*Attorney, Agent, or Firm*—Holman & Stern

[57] ABSTRACT

A hydraulic actuating arrangement for an aircraft control surface has a control circuit, responsive to a position selection input signal, for providing six nominally identical output control signals. Six pilot valves respectively responsive to the control signals provide six servo pressure signals to respective ones of six intermediate actuators. The intermediate actuators are resiliently coupled to each of two main hydraulic control valves. Three of the intermediate actuators and one of the main control valves are supplied from a first hydraulic pressure source, the remaining three intermediate actuators and the remaining main control valve being supplied from a second hydraulic pressure source. An output actuator is responsive to output pressures from either of the main control valves.

7 Claims, 4 Drawing Figures

HYDRAULIC ACTUATING ARRANGEMENT FOR AIRCRAFT CONTROL SURFACES

BACKGROUND OF THE INVENTION

This invention relates to actuating arrangements for aircraft control surfaces.

It is known to provide, in hydraulic actuating arrangements for aircraft control surfaces, a plurality of electrically operated pilot valves which are responsive to nominally identical input signals to control the application of nominally identical servo pressure signals to repective ones of a plurality of intermediate actuators, the intermediate actuators being coupled to a main control valve by means of which an operating pressure signal is applied to an output actuator which is connected, in use, to the aircraft control surface. One of said input signals, the pilot valve responsive to that signal, and an associated intermediate actuator, together comprise a single control channel. Such an actuating arrangement is thus composed of a plurality of control channels and the intermediate actuators are coupled to the main control valve in such a way that any one of said control channels can operate the main control valve, thus providing a level of redundancy which permits the input signals, or the associated devices, in one or more channels to fail.

It is also known to provide hydraulic actuating arrangements having two nominally identical hydraulic pressure supplies, one of these supplies being connected, at any one time, to the pilot valves and to the main control valve. Such arrangements further include a change-over device operable in the event of failure of one of the hydraulic pressure supplies to connect the other of the supplies to the pilot valves and control valve. These latter arrangements have the disadvantage that failure of the changeover device can cause failure of the entire actuating arrangement.

OBJECT OF THE INVENTION

It is an object of the present invention to provide, for an aircraft control surface, an actuating arrangement incorporating two hydraulic pressure supplies, and in which a hydraulic change-over device is unnecessary, the arrangement being capable of satisfactory operation in the event of failure of:
a. two of said control channels, or
b. one hydraulic pressure supply, or
c. one hydraulic pressure supply and a control channel associated with the other hydraulic pressure supply.

SUMMARY OF THE INVENTION

According to the invention a hydraulic actuating arrangement for an aircraft control surface comprises an electrical control circuit responsive to a position selection first input signal to provide six nominally identical electrical control signals, six pilot valves respectively responsive to said electrical control signals to provide respective servo pressure signals, six intermediate actuator devices responsive to respective ones of said servo pressure signals, two main control valves, a resilient mechanical coupling device interconnecting said intermediate actuators and said control valves, means for supplying first and second hydraulic pressures, a first three of said pilot valves and one of said main control valves being connected to one of said hydraulic supplies and a second three of said pilot valves and the other of said main control valves being connected to the other of said hydraulic pressures, and an output actuator responsive to the pressures from said main control valves, said output actuator being connected, in use, to vary the position of a control surface on an aircraft.

In a preferred embodiment of the invention the resilient mechanical coupling means comprises a member mounted for pivotal movement about an axis, a plurality of resilient cantilever elements secured to said member and extending therefrom radially of said axis, and means engaging said control valves and operable by pivotal movement of said member to actuate said control valves, the ends of said cantilever elements remote from said axis coacting with said intermediate actuators.

In a further preferred embodiment the control circuit includes a logic circuit responsive to the positions of said intermediate actuators, for providing a first indication when the operated position of one of said intermediate actuators differs substantially from the operated positions of the remaining intermediate actuators, and to provide a second indication when the operated positions of two of said intermediate actuators differ substantially from the operated position of the remainder of said intermediate actuators.

DESCRIPTION OF THE FIGURES

An embodiment of the invention will now be described by way of example and with reference to the accompanying drawings, in which.

DISCUSSION OF THE PREFERRED EMBODIMENT

Figure 1:
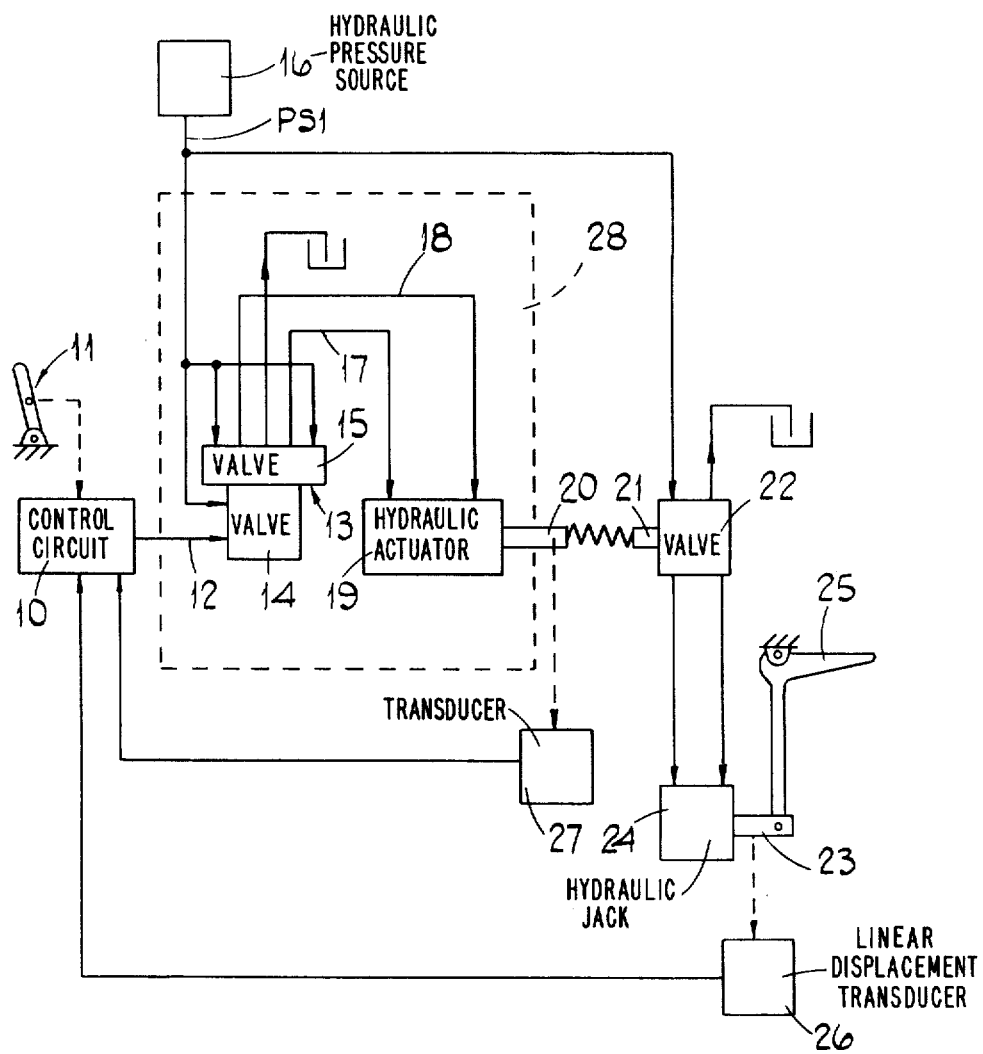
FIG. 1 shows diagrammatically a single channel actuating arrangement.

The single channel arrangement shown in FIG. 1 has a control circuit 10 which is responsive to the setting of a selector device 11 to provide an electrical control signal on a line 12 to a servo valve arrangement of a known type, indicated generally at 13. Valve arrangement 13 includes a first-state valve 14 which is responsive to the magnitude and polarity of the signal on line 12 to apply operating pressure signals to a second-stage spool valve 15. The operating pressure signal is derived from a source 16 of hydraulic pressure PS1. Movement of spool 15 by the aforesaid operating pressure signals results in application of pressure PS1 to respective ones of a pair of lines 17, 18.

An intermediate hydraulic actuator 19 includes an output plunger 20 which is movable in respective opposite directions by the signals on lines 17, 18. Plunger 20 is resiliently mechanically coupled to the spool 21 of a main control spool valve 22. Valve 22 controls the application of pressure PS1 to urge the output member 23 of a double-acting hydraulic jack 24 in a direction selected by the device 11. Output member 23 is connected to a control surface 25 of an aircraft.

The signal on line 12, the valve arrangement 13 and the actuator 19 combine to define a control channel 28. A linear displacement transducer 26 is responsive to the position of output member 23, and hence of surface 25, to provide a position feedback signal to control circuit 10. The signal on line 12 is thus a position error signal and valve arrangement 13 is such that in the absence of a signal on line 12 both of lines 17, 18 are isolated, locking intermediate actuator 19 in its last set position.

A further transducer 27 is responsive to the position of plunger 20 and provides a feedback signal to circuit 10, this latter signal effectively providing, in a manner to be described, an indication of any failure in the control channel 28.

Figure 2:
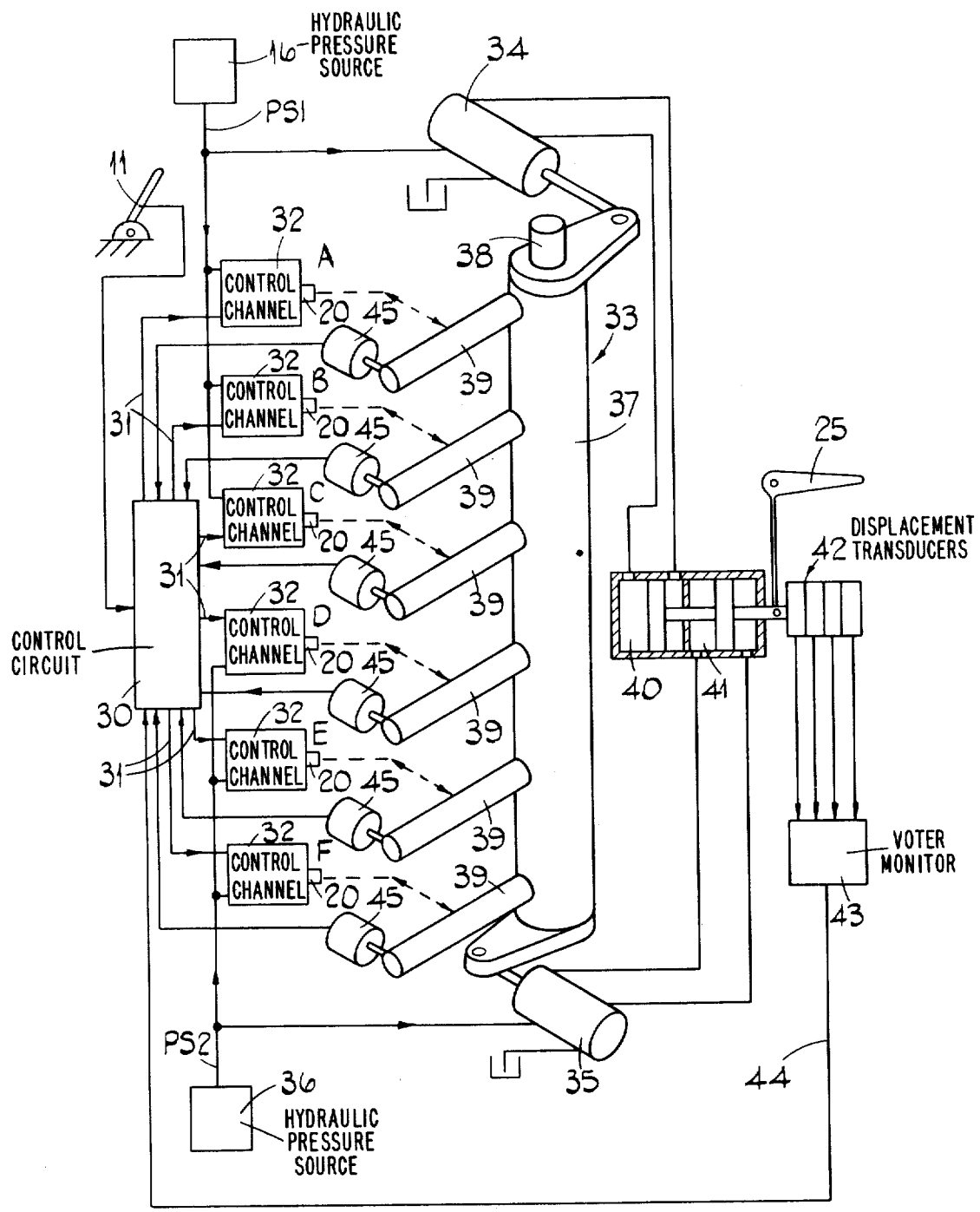
FIG. 2 shows diagrammatically a multi-channel actuating arrangement according to the invention.

The multi-channel arrangement shown in FIG. 2 has a control circuit 30 responsive to selector device 11. Circuit 30 is arranged to provide nominally identical electric control signals on each of six lines 31, to respective ones of six control channels 32, respectively labelled A to F, each of which is identical with the control channel 28 of FIG. 1. Control channels A, B, C are supplied with hydraulic pressure PS1 from source 16. Control channels D, E. F are supplied with a further, nominally identical, hydraulic pressure PS2 from a source 36.

The plungers 20 of the control channels 32 are resiliently mechanically coupled by a device 33 to a pair of main control spool valves 34, 35, similar to spool valve 15 of FIG. 1. Spool valves 34, 35 are respectively supplied with hydraulic pressures PS1 and PS2.

Device 33 comprises a cylindrical member 37 mounted for movement about a pivot 38. Six cantilever arms 39 are rigidly secured to member 37 and extend radially thereof. Respective ones of arms 39 are jointed to the plungers 20 at identical distances from the pivotal axis of member 37. Arms 39 thus act, if member 37 is restrained against movement, as stiff springs between plungers 20 and member 37.

Main control valves 34, 35 are responsive to pivotal movement of device 33 to apply hydraulic pressures PS1, PS2 to respective ones of a pair of tandemly arranged double-acting piston and cylinder units 40, 41 which together form a main actuator for the aircraft control surface 25. Four displacement transducers 42 are each responsive to the position of the control surface 25 to provide nominally identical electrical feedback signals.

A known type of circuit 43, of the kind commonly referred to as a voter monitor, is responsive to the signals from the transducers 42, so as to provide, on lines 44, six feedback signals which are weighted averages of the output signals from transducers 42. Thus, if one of the transducers 42 is defective, so that its ouput signal differs substantially from the output signals of the remaining three transducers, the signal from the defective transducer will have a reduced effect on the feedback signal on line 44. The signals on lines 44 are supplied to control circuit 30, so that the signals on lines 31 are effectively position error signals.

Figure 3:
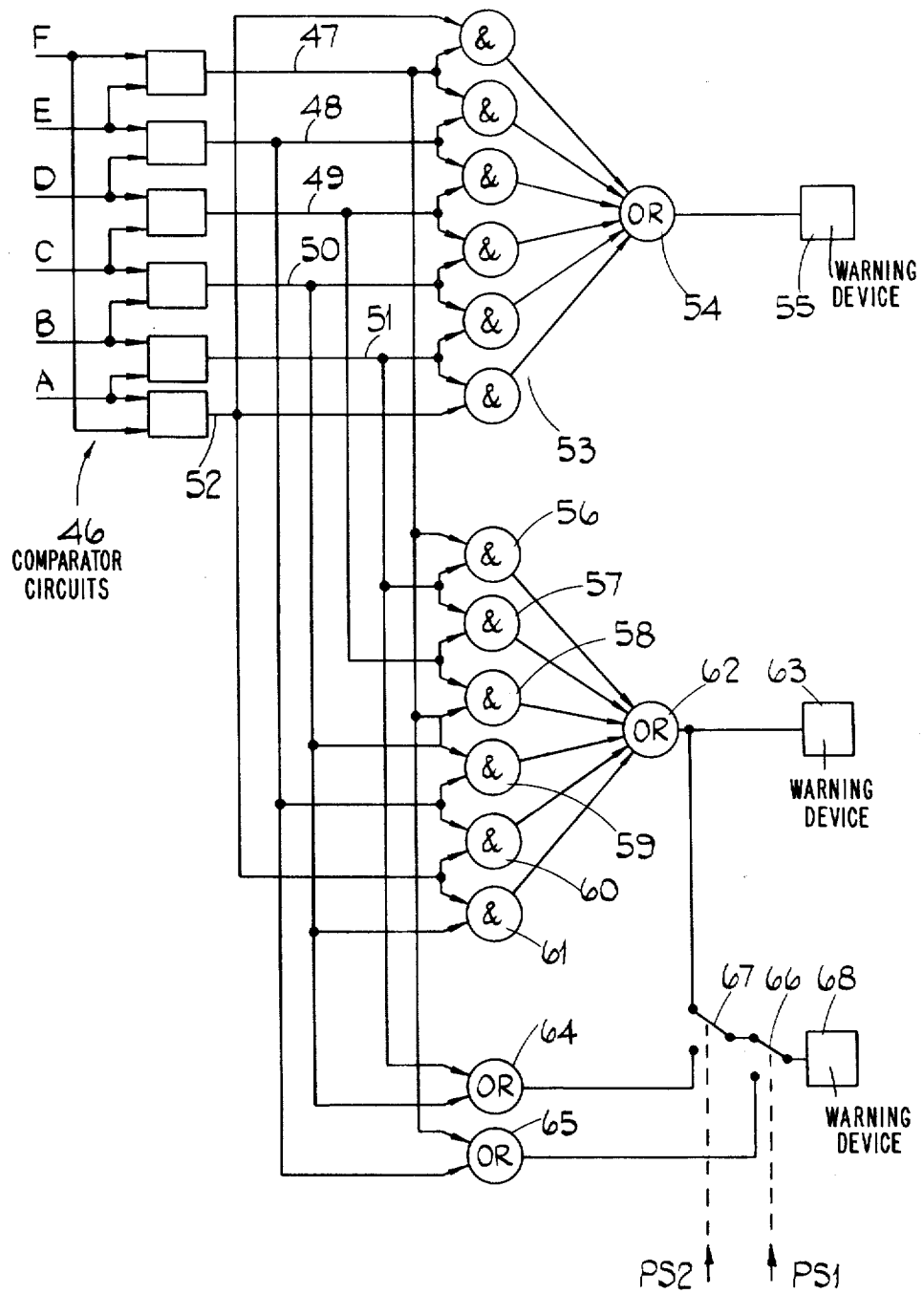
FIG. 3 shows a fault-detection logic circuit forming part of the arrangement of FIG. 2.

Six linear displacement transducers 45 are respectively engaged with the ends of arms 39 remote from member 37, and thus provide indications of the operated positions of the respective arms 39, and hence of the operated positions of the plungers 20 of the respective control channels A to F. As shown in FIG. 3, control circuit 30 includes six comparator circuits 46 which are respectively responsive to signals from pairs of adjacent transducers 45, and provide signals on lines 47, 48, 49, 50, 51, 52 respectively when the plungers 20 of pairs of adjacent control channels have significantly different operated positions. Comparator circuits 46 are arranged to provide signals when the differences between the outputs of adjacent ones of transducers 45 are greater than the differences which would be ascribable to normal circuit 'drift'.

Six two-input AND gates 53 are responsive to signals on pairs of the lines 47 to 52, the outputs of these AND gates 53 providing the inputs of a six-input OR gate 54. The output of OR gate 54 is connected to a warning device 55, which may provide a visual or audible warning.

A failure of one of the control channels A to F will thus result in a signal on two adjacent ones of lines 47 to 52. One of AND gates 53 will be operated and the device 55 energised. Device 55 will not provide any indication that more than one control channel has failed. The circuit of FIG. 3 includes, however, additional elements which provide such an indication. Three AND gates 56, 57, 58 are connected as shown so as to be responsive to signals on lines 47, 49 and 51. Three further AND gates 59, 60, 61 are connected so as to be responsive to signals on lines 48, 50, 52. The outputs of AND gates 56 to 61 provide the inputs of an OR gate 62. The arrangement is such that there is an output from OR gate 62 only when two or more of the control channels A to F have malfunctioned. An ouput signal from OR gate 62 energises a warning device 63, identical with device 55.

Failure of one of the hydraulic supply pressures PS1, PS2 will cause failure of the three control channels powered by that pressure. Both devices 55 and 63 will thus be energised. FIG. 3 shows additional circuit elements which enable monitoring of the three control channels associated with the remaining hydraulic pressure. An OR gate 64 has its inputs connected to lines 50, 51 and a further OR gate 65 has its inputs connected to lines 47, 48. Two change-over switches 66, 67 are respectively responsive to the supply pressures PS1, PS2, so that in the absence of these pressures switches 66, 67 are moved from the positions shown, in which the output of OR gate 62 is connected to a third warning device 68, to their alternate operated positions.

In the alternative position of switch 66, device 68 is connected to the output of OR gate 65. In the alternative position of switch 67, device 68 is connected to the output of OR gate 64, provided that pressure PS1 is present. Thus if, for example, pressure PS2 fails, warning device 68 becomes responsive to signals on lines 50, 51, that is responsive to failure of any one of control channels A, B, C.

In use, any two of the intermediate actuators 32 can move the member 37 by a sufficient amount to operate the main control valves 34, 35. The arrangement will thus continue to move control surface 25, even in the event of three control channels being inoperative due to a hydraulic failure, and one of the remaining control channels being inoperative due to electrical failure.

Where the acceptable output voltage drift from transducers 45 is relatively large, the logic circuit of FIG. 3 may not provide a fault indication, even when the output of one of transducers 45 goes outside a predetermined 'failure' limit, since the difference between the signal on a failed channel and the signal on an adjacent drifted channel may be insufficient to provide a comparator output. The circuit shown in FIG. 4 overcomes this difficulty.

Figure 4:
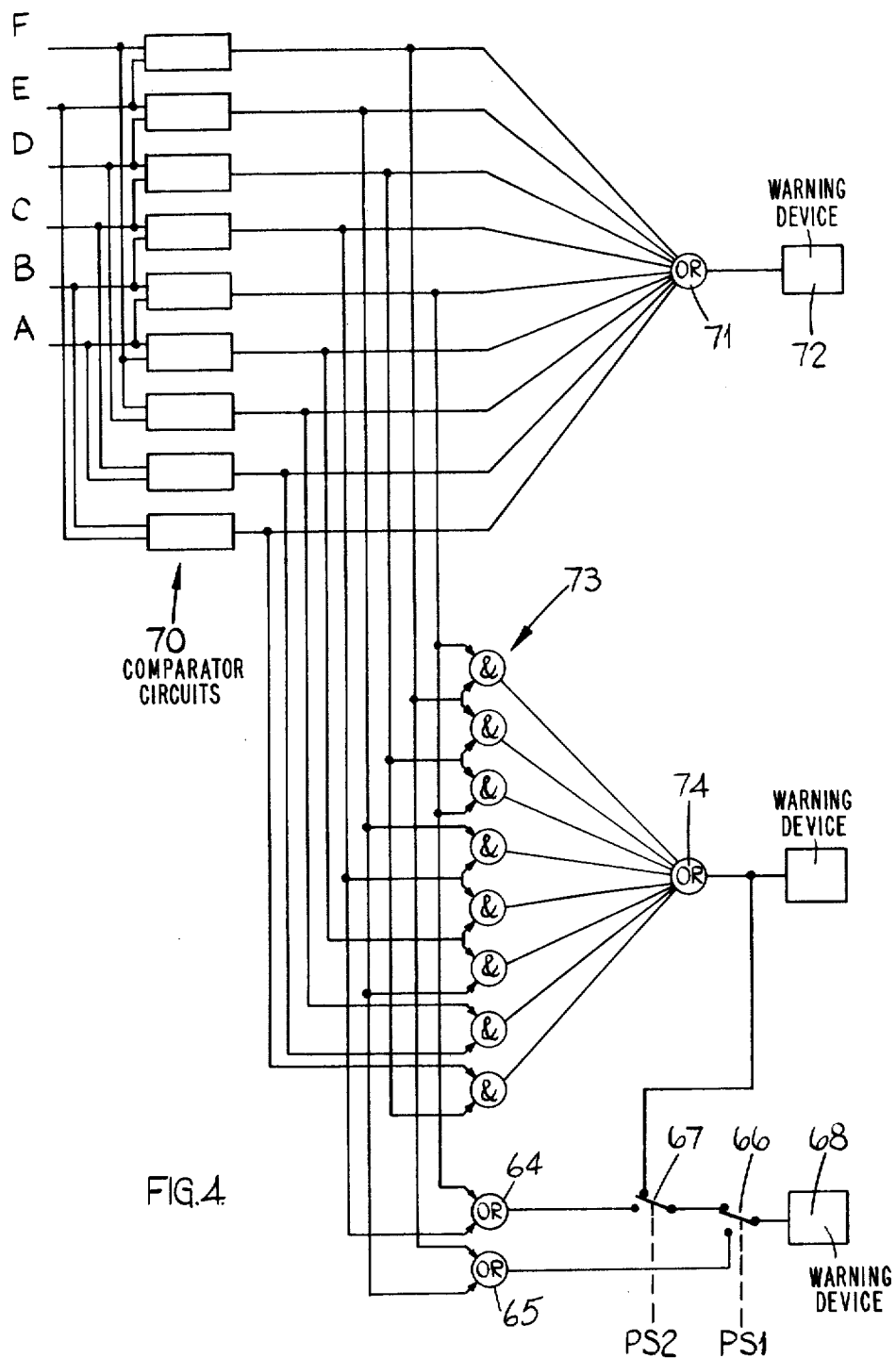
FIG. 4 shows an alternative form of fault-detection logic circuit.

The circuit of FIG. 4 has nine comparator circuits 70 each of which is responsive to the output signals from pairs of transducers 45. The circuits 70 are operable when the differences between input signals of the respective pairs exceed the acceptable drift level, to provide input signals to a nine-input OR gate 71. The output of OR gate 71 is connected to a suitable warning device 72.

A group 73 of eight two-input AND gates are responsive to signals on selected pairs of the inputs to OR gate 71. The outputs of the AND gates 73 form the inputs of an eight input OR gate 74. The output of OR gate 74 is connected to a suitable warning device.

As before, a failure of one of control channels A to F will cause device 72 to be energised, and failure of two or more of channels A to F causes device 74 to be energised.

The circuit of FIG. 4 also includes the gates 64, 65, switch elements 66, 67, and device 68, previously described with reference to FIG. 3. The function of this part of the circuit is the same as that of the corresponding part of the circuit of FIG. 3, and in the event of failure of one of the hydraulic supply pressures enables the operation of the three control channels which are associated with the remaining supply pressure to be monitored.

We claim:

1. A hydraulic actuating arrangement for an aircraft control surface, comprising an electrical control circuit responsive to a position selection first input signal to provide six nominally identical electrical control signals, six pilot valves respectively responsive to said electrical control signals to provide respective servo pressure signals, six intermediate actuator devices responsive to respective ones of said servo pressure signals, two main control valves, a resilient mechanical coupling device interconnecting said intermediate actuators and said control valves, means for supplying first and sceond hydraulic pressures, a first three of said pilot valves and one of said main control valves being connected to one of said hydraulic supplies and a second three of said pilot valves and the other of said main control valves being connected to the other of said hydraulic pressures, and an output actuator responsive to the pressures from said main control valves, said output actuator being connected, in use, to vary the position of a control surface on an aircraft.

2. An arrangement as claimed in claim 1 in which said output actuator comprises two piston and cylinder units arranged in tandem and interconnected to move in unison, said units being responsive to pressures from respective ones of said main control valves.

3. An arrangement as claimed in claim 1 which includes means, responsive to the position of said output actuator, for providing a second input signal to said electrical control circuit.

4. An arrangement as claimed in claim 1 in which said control circuit includes a logic circuit, responsive to the positions of said intermediate actuators, for providing a first indication when the operated position of one of said intermediate actuators differs substantially from the operated positions of the remaining intermediate actuators, and to provide a second indication when the operated positions of two of said intermediate actuators differ substantially from the operated position of the remainder of said intermediate actuators.

5. An arrangement as claimed in claim 4 in which said logic circuit includes means, responsive to said servo pressure signals, to provide a third indication when one of said servo pressure signals fails.

6. A hydraulic actuating arrangement for an aircraft control surface, comprising an electrical control circuit responsive to a position selection first input signal to provide six nominally identical electrical control signals, six pilot valves respectively responsive to said electrical control signals to provide respective servo pressure signals, six intermediate actuator devices responsive to respective ones of said servo pressure signals, two main control valves, a resilient mechanical coupling device interconnecting said intermediate actuators and said control valves, means for supplying first and second hydraulic pressures, a first three of said pilot valves and one of said main control valves being connected to one of said hydraulic supplies and a second three of said pilot valves and the other of said main control valves being connected to the other of said hydraulic pressures. and an output actuator responsive to the pressures from said main control valves, said output actuator being connected, in use, to vary the position of a control surface on an aircraft; said mechanical coupling means comprises a member mounted for pivotal movement about an axis, a plurality of resilient cantilever elements secured to said member and extending therefrom radially of said axis, and means engaging said control valves and operable by pivotal movement of said member to actuate said control valves, the ends of said cantilever elements remote from said axis coacting with said intermediate actuators.

7. The arrangement as claimed in claim 6, in which said control circuit includes a logic circuit, responsive to the positions of said intermediate actuators, for providing a first indication when the operated position of one of said intermediate actuators differs substantially from the operated positions of the remaining intermediate actuators, and to provide a second indication when the operated positions of two of said intermediate actuators differ substantially from the operated position of the remainder of said intermediate actuators; a plurality of transducers responsive to the positions of said cantilever elements to provide a plurality of third input signals to said control circuit, and in which said control circuit includes comparator circuits which are responsive to signals from respective pairs of said transducers to provide signals to said logic circuit when adjacent pairs of said intermediate actuators have different operated positions.

* * * * *